US012295079B2

(12) United States Patent
Fu et al.

(10) Patent No.: US 12,295,079 B2
(45) Date of Patent: May 6, 2025

(54) LED DRIVING CIRCUIT AND LED LIGHTING CIRCUIT

(71) Applicant: SIGNIFY HOLDING B.V., Eindhoven (NL)

(72) Inventors: Jie Fu, Shanghai (CN); Shiguang Sun, Shanghai (CN); Zhiquan Chen, Shanghai (CN); Feng Ju, Shanghai (CN); Yu Wang, Shanghai (CN); Gang Wang, Shanghai (CH)

(73) Assignee: SIGNIFY HOLDING, B.V., Eindhoven (NL)

( * ) Notice: Subject to any disclaimer, the term of this patent is extended or adjusted under 35 U.S.C. 154(b) by 19 days.

(21) Appl. No.: 18/556,193

(22) PCT Filed: Apr. 19, 2022

(86) PCT No.: PCT/EP2022/060237
§ 371 (c)(1),
(2) Date: Oct. 19, 2023

(87) PCT Pub. No.: WO2022/228935
PCT Pub. Date: Nov. 3, 2022

(65) Prior Publication Data

US 2024/0196497 A1 Jun. 13, 2024

(30) Foreign Application Priority Data

Apr. 25, 2021 (WO) ................ PCT/CN2021/089720
Jul. 13, 2021 (EP) .................................... 21185224

(51) Int. Cl.
*H05B 45/50* (2022.01)
*H05B 45/38* (2020.01)

(52) U.S. Cl.
CPC .................................. *H05B 45/50* (2020.01)

(58) Field of Classification Search
None
See application file for complete search history.

(56) References Cited

U.S. PATENT DOCUMENTS

2014/0197739 A1* 7/2014 Lu .......................... H05B 45/50 315/122
2014/0300274 A1* 10/2014 Acatrinei ........... H05B 45/3578 315/122

(Continued)

FOREIGN PATENT DOCUMENTS

CN 107969048 A 4/2018
CN 108123418 A 6/2018
WO 2020007783 A1 1/2020

*Primary Examiner* — Anh Q Tran

(57) ABSTRACT

To provide a safer over voltage protection, it is provided a driving circuit for a light emitting source, comprising an input adapted to receive a power supply; a conversion circuit, adapted to convert the power supply and provide a converted power, comprising a power switch (M2); an output, adapted to output the converted power; an output capacitor (C2) connected at the output; a first control circuit coupled to the output and connected to the power switch (M2), adapted to sense a voltage corresponding to the voltage on the output capacitor and control the power switch operate in a power-reducing mode to reduce the converted power when the voltage corresponding to the voltage on the output capacitor sensed by the first control circuit exceeds a first level; and a second control circuit (D15) connected to the output capacitor (C2) and connected to a control terminal of the power switch (M2), adapted to sense a voltage at the output capacitor (C2) and damage and make the power switch (M2) unoperational permanently when the voltage at the output capacitor (C2) sensed by the second control circuit exceeds a second level.

10 Claims, 5 Drawing Sheets

(56) References Cited

U.S. PATENT DOCUMENTS

| | | | | |
|---|---|---|---|---|
| 2014/0354159 A1* | 12/2014 | Zhang | .................... | H05B 45/38<br>315/127 |
| 2018/0035512 A1* | 2/2018 | Nagao | .................... | H05B 45/50 |

* cited by examiner

LED DRIVING CIRCUIT AND LED LIGHTING CIRCUIT

CROSS-REFERENCE TO PRIOR APPLICATIONS

This application is the U.S. National Phase application under 35 U.S.C. § 371 of International Application No. PCT/EP2022/060237, filed on Apr. 19, 2022, which claims the benefit of European Patent Application No. 21185224.9, filed on Jul. 13, 2021, and International Application No. PCT/CN2021/089720, filed on Apr. 25, 2021. These applications are hereby incorporated by reference herein.

FIELD OF THE INVENTION

This invention relates to a LED driving circuit. In particular it relates to a LED driving circuit with improved safety against overvoltage.

BACKGROUND OF THE INVENTION

Over voltage protection (OVP) is widely used in the LED driver to ensure safety, etc. preventing electrolytic capacitor (E-CAP) blowing up when LEDs fails. If it is blown up, the electrolytic fluid may flow in the circuit and cause more serious problems such like short circuiting which may lead human electric short. In implementing OVP, the voltage on E-CAP (usually output voltage) is detected, and if it is too high, the driver operates in a power-reducing mode wherein the main switch of the LED driver is turned open or its duty cycle is reduced, to stop/reduce the power conversion/output of the LED driver and prevent/reduce energy further flow into E-CAP, therefore the voltage will not exceed safe level. FIG. 1 shows the existing usual method for OVP. The LED driver comprises a rectifier formed by diodes D2 to D5, a boost converter formed by an inductor L1, a main switch M1, and an output diode D1. Output capacitor is C1 and LED is D13. The output voltage is directly sensed at the anode of the output capacitor C1 via a voltage divider formed by resistors R1 to R4, to be compared with a reference voltage Vref by an op-amp U2, which may be part of an IC CMP. If the voltage on capacitor C1 is over the reference voltage Vref, a signal will be output to the driving portion DRV of the main switch M1 to stop the driving and keep the main switch M1 open.

The implementation in FIG. 1 needs the OVP sensing resistors to handle high output voltage directly. So the selected OVP sensing resistors should be high voltage rating like R1 to R4 and those sensing resistors may have large size, or should comprise a lot of low voltage-rated resistors in series which also have large size in total. For small size applications, the implementation in FIG. 2 is proposed. The LED driver comprises a rectifier formed by diodes D7 to D10, a boost converter formed by an inductor L2, a main switch M2, and an output diode D6. Output capacitor is C2 and LED is D12. An inductor L3 is magnetically coupled to the boost inductor L2 with a coil ratio of n:1, wherein n stands for the number of coils in the inductor L2 divided by the number of coils in the inductor L3. A voltage adder is formed by a diode D14 and a capacitor C3. In a charging phase of the boost converter when the switch M2 is close, the inductor L3 is induced with a voltage 1/n of the input voltage/the positive voltage (left terminal is positive) on the inductor L2 and stores it on the capacitor C3. And in a freewheeling phase, the inductor L3 is induced with a voltage 1/n of the negative voltage freewheeling voltage (left terminal is negative) on the inductor L2. This voltage is added with the previously stored voltage on the capacitor C3 and output to a buffer capacitor C4 via a diode D11, forming a voltage Vcc. Since the output voltage Vo is the sum of the input voltage and the freewheeling voltage on the inductor L2, the voltage Vcc is 1/n proportional to the output voltage Vo. And this voltage Vcc is sensed for OVP purpose, which also involves an op-amp and a reference ref, and operates similar as above. Since the level of Vcc is substantially smaller than the level of the output voltage Vo, only two 0402 size resistors R5 and R6 are needed for forming a low voltage rated divider for OVP; whereas in FIG. 1, since output voltage is very high—over 400V, three 1206 size components (R1, R2, R3) and one 0402 size (R4) are needed for OVP.

Note that the above two kinds of overvoltage protection is recoverable since the power switch is still intact and is just turned off or switched in a lower duty cycle.

Although the circuit in FIG. 2 can help to reduce the size, the tolerance for protection point is very large since: the tolerance of inductor L2 and L3's coupling coefficient is very large, eg. >10%. And considering the tolerance of the voltage divider and the tolerance of voltage reference ref, the total tolerance may reach +/−18%. For a boost converter for LED with an output voltage of 400V, the tolerance would be as close to 80V. The voltage reference ref and the comparator may be often integrated in an IC and they would also have the tolerances similar with discrete components solutions. Similarly, the tolerance of the voltage divider and the voltage reference ref also influence the circuit in FIG. 1. Such a large tolerance will make the circuit in a risk. More specifically, the output E-CAP may have to take an overvoltage A as shown in FIG. 5 so high that may blow up the E-CAP, but this overvoltage A still is below the OVP threshold of the first control circuit due to tolerance and thus not considered as an overvoltage by the inaccurate measurement of the OVP (first control circuit), thus the first control circuit would not be triggered to prevent the output E-CAP from blowing up due to the overvoltage.

CN107969048A discloses detecting a voltage across a buck inductor to trigger over voltage protection. CN108123418A discloses using current mirrors to process the OVP signal.

SUMMARY OF THE INVENTION

The idea of the embodiments of the invention is adding another control loop, on top of the existing overvoltage control loop, and the another control loop directly electrically connects the output capacitor and a control terminal of the main switch. This control loop is triggered at or slightly below a minimum tolerance "allowable maximum voltage" of the output capacitor and applies at least a portion of the voltage on the output capacitor directly on the control terminal of the main switch. The "allowable maximum voltage" is the voltage which can trigger the electrical capacitor blowing up. This would damage the main switch, and prevent it from further switching and outputting energy to the output capacitor, thus the voltage of the output capacitor would not increase any more and the output capacitor would not be likely to blow up. The applicant respectfully believes such a double-overvoltage protection, wherein a second control loop with a smaller tolerance in order to supplement the main control loop's risk of inactivation due to its larger tolerance, is an unobvious invention over the prior art.

In one aspect of the invention, it is proposed a driving circuit for a light emitting source, comprising an input adapted to receive a power supply; a conversion circuit, adapted to convert the power supply and provide a converted power, comprising a power switch; an output, adapted to output the converted power; an output capacitor connected at the output; a first control circuit coupled to the output and connected to the power switch, adapted to sense a voltage corresponding to the voltage on the output capacitor and control the power switch operate in a power-reducing mode to reduce the converted power when the voltage corresponding to the voltage on the output capacitor sensed by the first control circuit exceeds a first level; and a second control circuit connected to the output capacitor and connected to a control terminal of the power switch, adapted to sense a voltage at the output capacitor and electrically connect the output capacitor and the control terminal, and apply, between the control terminal and a current-out terminal of the power switch, a first portion of the voltage on the output capacitor which first portion being higher than a maximum rating voltage for the control terminal and the current-out terminal so as to damage and make the power switch unoperational permanently when the voltage at the output capacitor sensed by the second control circuit exceeds a second level.

In the above aspect, the second control circuit is added to further improve the safety again overvoltage. If the output capacitor has undergone a blow up and fluid flowing out, the circuit is even more risky, let alone be usable, thus it is acceptable to destroy the power switch and disable the converter/driving circuit permanently under the circumstance that the output capacitor is about to blow up.

In a further embodiment, the highest value of second control unit's second level, considering the tolerance, is smaller than the lowest value of the—"allowable maximum voltage" of the output capacitor, considering the tolerance, wherein a voltage on the output capacitor above the "allowable maximum voltage" may blow up the output capacitor.

This embodiment ensures that any actual voltage on the output capacitor, as long as it is higher than the lowest "allowable maximum voltage" of blown up, would trigger the second control circuit. This embodiment provides reliable protection for capacitor's blow up.

In a further embodiment, the nominal value of the first level is less than the allowable maximum voltage may blow up the output capacitor. This is the ordinary requirement of the first control circuit for OVP.

In a still further embodiment, the nominal value of the second level is higher than the nominal value of the first level. This makes that an overvoltage would more normally trigger the first control circuit to reduce output power, not trigger the second control circuit, thus the power switch of the driving circuit is not always destroyed and is recoverable from overvoltage.

In an embodiment, the second control circuit comprises a voltage triggering component connected between an anode of the output capacitor and the control terminal of the power switch, the current-out terminal (the current-out terminal includes but not limited to source terminal of N-MOSFET, GaN HEMET, emitter of NPN BJT, etc) of the power switch and the cathode of the output capacitor are on the substantially same voltage potential, and the voltage triggering component is adapted to breakdown and apply a first portion of the voltage on the output capacitor across the control terminal and the current-out terminal of the power switch.

This embodiment uses a relatively simple and low cost component to detect the overvoltage and applying the overvoltage itself to destroy the power switch.

In a further embodiment, the voltage trigger component is adapted to clamp at most a second portion of the output voltage after breaking down such that the first portion of the output voltage is higher than a maximum rating voltage for the control terminal and the current-out terminal of the power switch, optionally the maximum rating voltage for the control terminal is around 20V. Normally the voltage trigger component would only take a small or zero voltage on it after break down, thus the remaining overvoltage is sufficient to destroy the power switch.

In implementations, the voltage trigger component comprises at least one of: a DIAC (diode for alternating current); TSS (transient surge suppressor); a gas discharge tube; and a VDR (voltage dependent resistor);

Those are very common voltage trigger component with small tolerance thus suitable for being used in the present application. TSS, DIAC, and gas discharge tube are likely to clamp a very small voltage, if any, on itself after breaking down thus most of the overvoltage on the output capacitor will apply on the control terminal of the power switch to destroy the power switch very quickly. As to the VDR, as along as its clamping voltage is properly selected, the remaining voltage (equal to the overvoltage on the output capacitor 10 subtracting the clamping voltage) is still efficient to the power switch.

In an embodiment, the first control circuit is implemented at least partially by an IC. IC tends to have larger tolerance in realizing overvoltage protection, thus it is beneficial to use the idea of the present application as a supplementary protection approach to double the overvoltage protection.

In a further embodiment, the first control circuit comprises a voltage divider to sense the output voltage, the voltage divider being with a first tolerance, and the first control circuit comprises a circuit to generate a reference voltage, and a comparator for comparing the sensed voltage by the voltage divider with the reference voltage, wherein the circuit to generate a reference voltage being with a second tolerance.

The embodiment lists the essential portion of the first control circuit and the originals of the tolerance.

In alternative embodiments, the first control circuit is either:

- connected to the output capacitor; or
- coupled to a power commutation component of the conversion circuit whose voltage is reflecting a voltage on the output capacitor, so as to sense a voltage at the output capacitor.

The idea of the invention is applicable for both of direct voltage detection and an indirect voltage detection in OVP.

In a further embodiment, the power commutation component comprises a power inductor, the first control circuit is coupled to the power inductor of the conversion circuit via a sensing winding magnetically coupled to the power inductor, wherein said sensing winding has a third tolerance in reflecting the voltage on the output capacitor. The OVP using indirect voltage detection has large tolerance, thus the present application is quite suitable to supplement to it.

In a second aspect of the invention, it is provided a lighting circuit comprising the driving circuit according to the first aspect and further comprising the light emitting source connected at the output of the driving circuit. This aspect provides the light circuit with the light emitting source and the proposed OVP circuit as a whole.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
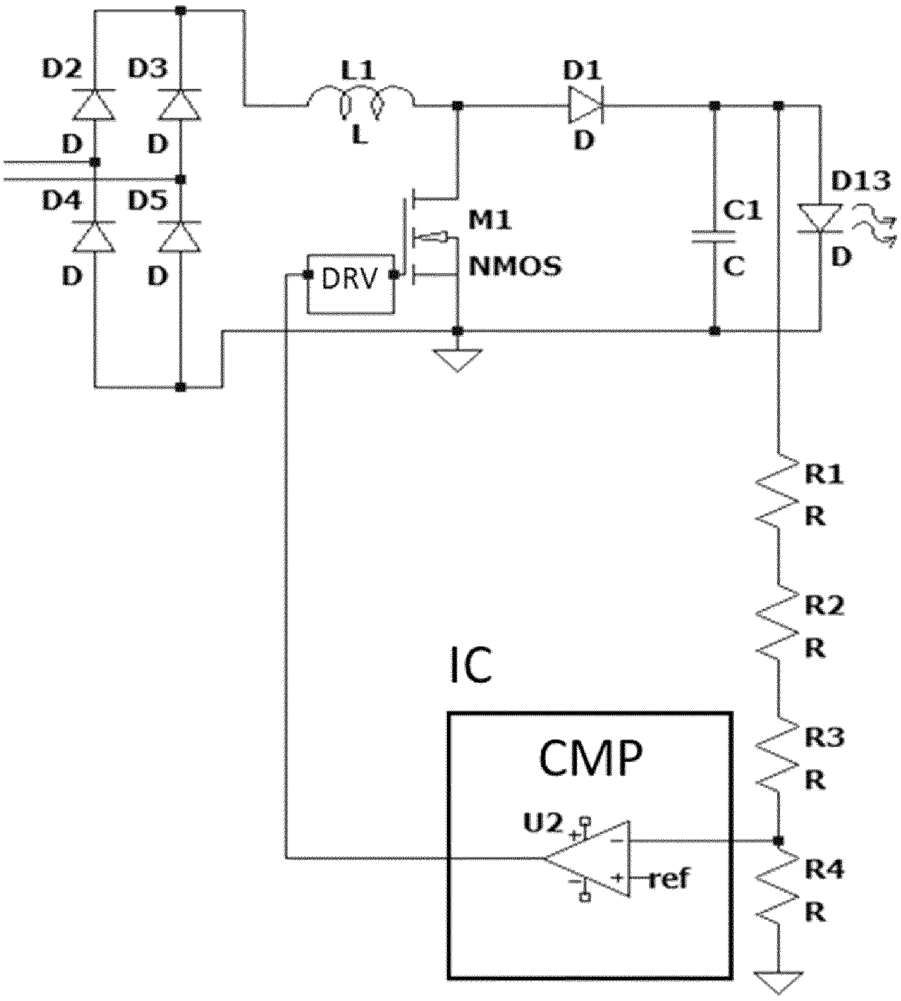
FIG. 1 shows a known LED driving circuit with a voltage feedback loop.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

Figure 2:
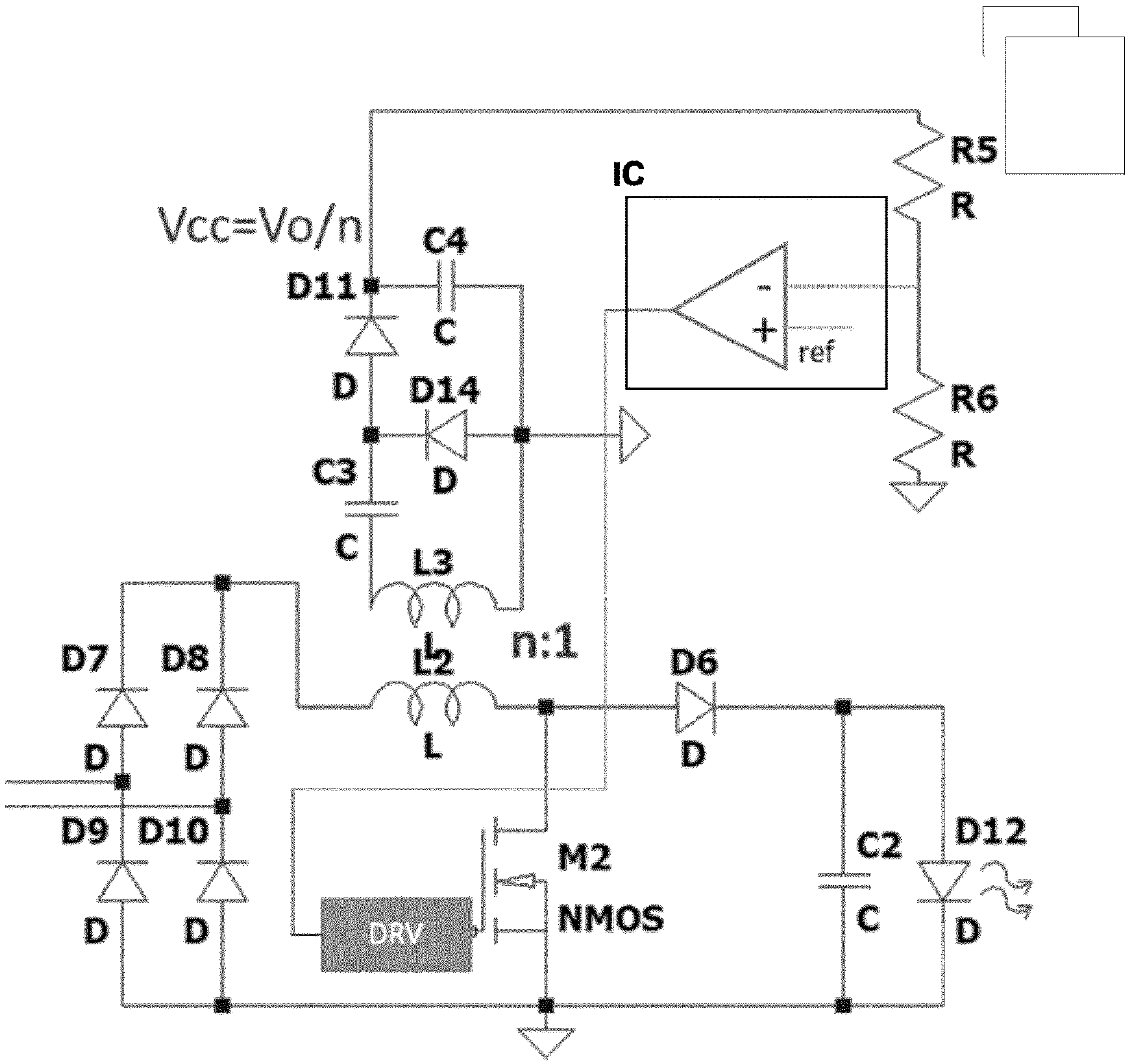
FIG. 2 shows another known LED driving circuit with another voltage feedback loop.
Figure 3:
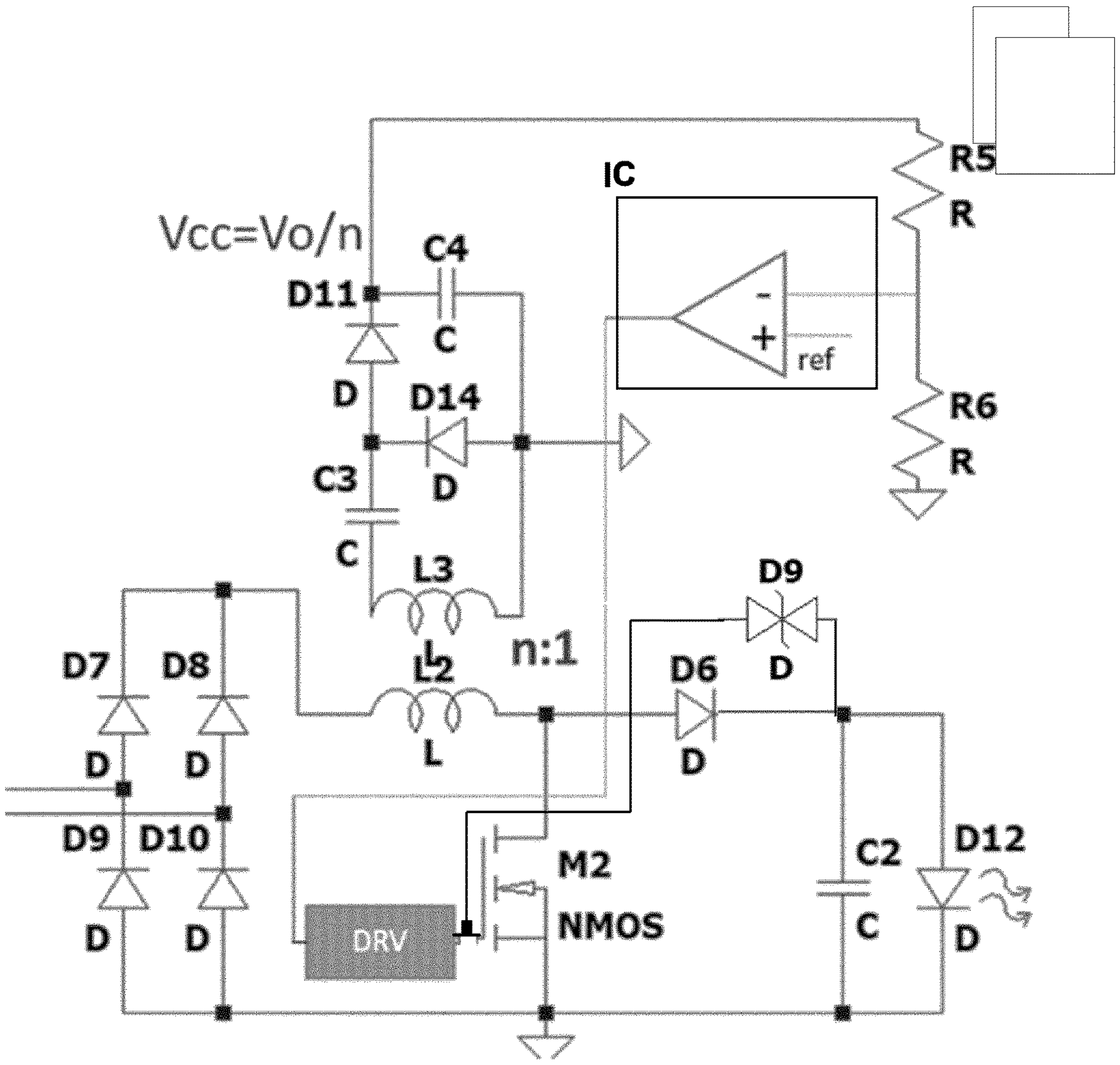
FIG. 3 shows a LED lighting circuit according to an embodiment of the present invention.

FIG. 3 shows one implementation of this invention. The components with same reference signs as those in FIG. 2 have same/similar functions, especially that the first control circuit for OVP is similar as that in FIG. 2, thus here would not give redundant description.

The additional second control circuit is the essential innovation of the present application. It is connected to the output capacitor C2 and connected to a control terminal of the power switch M2, adapted to sense a voltage at the output capacitor C2 and damage and make the power switch M2 unoperational permanently when the voltage at the output capacitor C2 sensed by the second control circuit exceeds a second level. The second level is smaller or equal to the allowable maximum voltage of the output capacitor, so an overvoltage above the allowable maximum voltage of the output capacitor can be prevented. On top of the first control circuit, the second control circuit acts as a last stand for overvoltage protection, in an extreme condition that the first control circuit does not active due to for example failure or tolerance thereof.

The second control circuit preferably comprises a voltage triggering component adapted to breakdown and apply a first portion of the voltage on the output capacitor C2 across the control terminal and the current-out terminal of the power switch M2.

Figure 4:
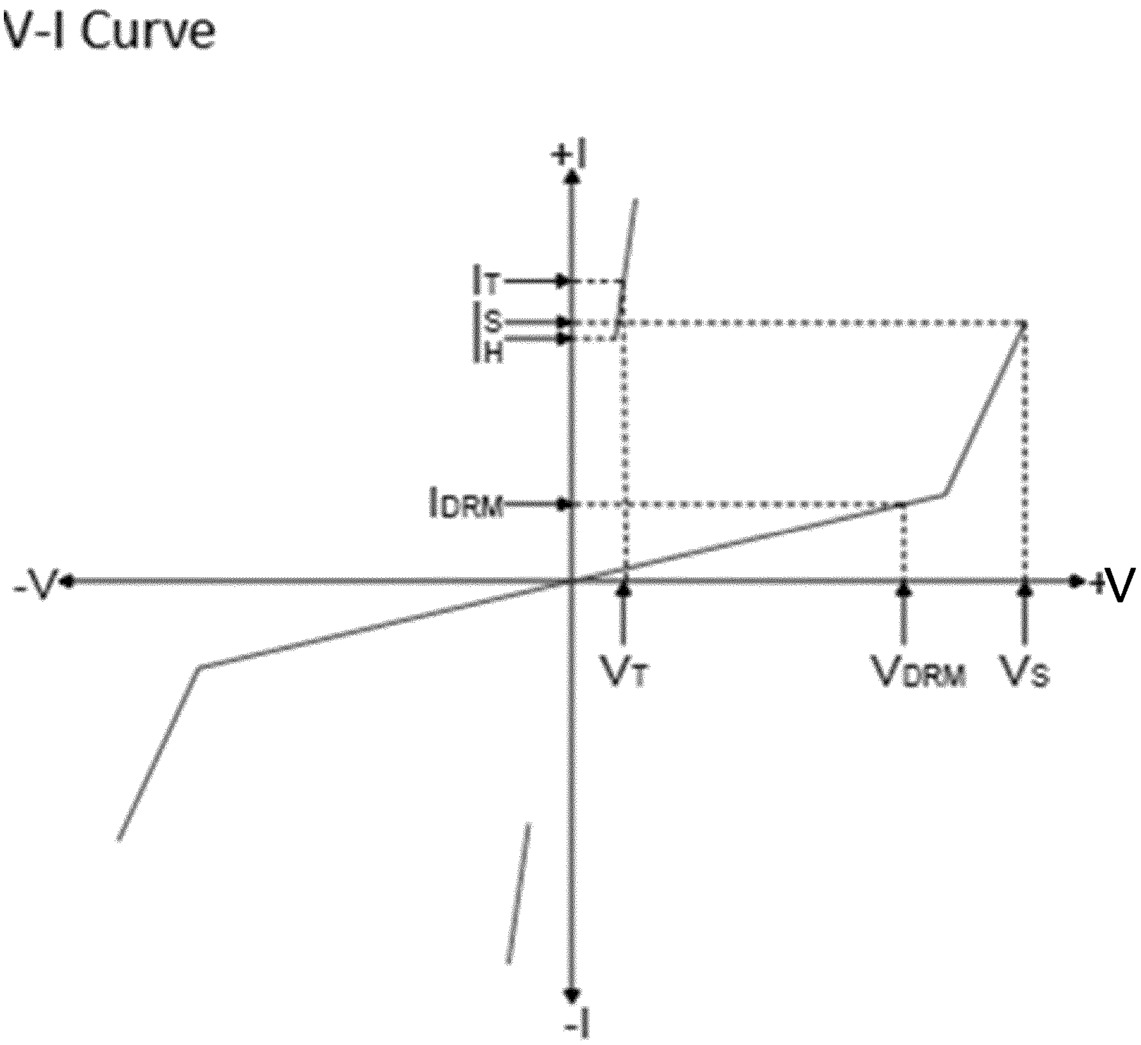
FIG. 4 shows a V-I curve of the voltage triggering component of the second control circuit.

Preferably, the voltage triggering component is implemented by a Thyristor Surge Suppressors (TSS) D9. FIG. 4 shows the typic characteristic of TSS. At normal output voltage on the capacitor C1, the TSS does not breakdown, and leakage current of Tss is very small −5 uA and it will not influence the normal operation of main switch M1. When LED fails and becomes open, the boost converter still outputs current to charge the capacitor C2. Due to the above mentioned tolerance of the existing voltage feedback loop/first control circuit, it may not activate in time before the voltage of the capacitor C2 reaches a risky threshold of blown up. instead, the second control circuit may be activated in time. As the voltage on TSS is over VDRM, the current flow throw it increases dramatically and the voltage on gate of the MOSFET M2 will increase very quickly and over the safe voltage level 20V of the gate, and destroy the gate of MOSFET switch. Since M2 is destroyed, no more switching will be carried out and no more energy will flow into C2, and this prevents C2 from blowing up. As to the implementation of the voltage triggering component, two pieces of P3500DM from JIEJIE microelectronics Co. Ltd can be used as D9. The tolerance of this TSS D9 is easily controlled below +/−10%. Two pieces of P3500DM also can be integrated into one package. The TSS can also be replaced by a gas discharge tube, a VDR, or any other component with a voltage-triggered variable impedance, in other words, its impedance, either a voltage across it become less or a current through it becomes huge once a voltage across it reaches a threshold. The gas discharge tube, in a voltage near 400 or 600 volts, also has small tolerance like 40V only.

What is to be noted is that for the TSS selection, the nominal value of VDRM should be higher than the rated OVP setting point, especially for IC (though the real OVP point of the first control circuit, product by product, may vary due to tolerance and some may reach higher than the VDRM). The purpose of this is making as much as possible that a normal over voltage protection in ideal condition should be carried by the first control circuit in first place, and such a protection is recoverable. The over voltage protection in extreme condition is handled by the second control circuit in first place wherein the real OVP point of the first circuit has drifted higher than the VDRM due to tolerance.

And the minimum of VDRM also needs to be below the minimum tolerance value of the allowable maximum pulse allowable maximum voltage on the E-CAP. Thus at an extreme condition (wherein the real value of the allowable maximum pulse voltage is lower, due to tolerance, than the real OVP setting point in the first control circuit, due to tolerance), the maximum of VDRM is still lower than the real value of the allowable maximum pulse voltage, such that a voltage on the E-CAP, even if higher than the minimum value of the allowable maximum pulse voltage, is still above the VDRM and can quickly activate the TSS to destroy the switch. The output capacitor may expose to a voltage higher than the allowable maximum pulse voltage for only a short duration, and this could be tolerated by the output capacitor without blown up immediately.

Figure 5:
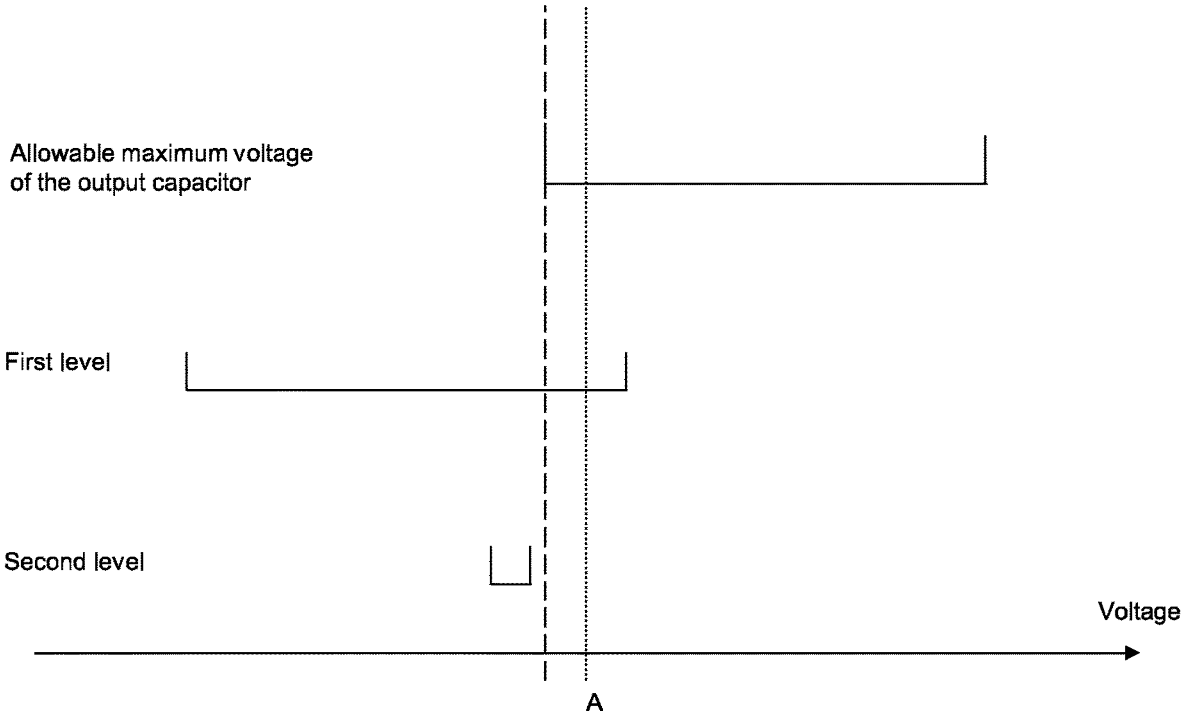
FIG. 5 shows the spreading (due to tolerance) of the allowable maximum voltage of the output capacitor, the first level of the first control circuit, and the second level of the second control circuit.

Taking FIG. 5 for example again, as shown by the dash line, the second level which is the VDRM is determined that its highest value, considering the tolerance, is smaller than the lowest value of the allowable maximum voltage of the output capacitor C2, considering the tolerance. Still taking point A as example, when an overvoltage point A occurs, above the lowest allowable maximum voltage of the output capacitor C2 and is above the second level, it will trigger the second control circuit, to protect the E-CAP from blown up. In this case, the first control circuit would not be activated still since point A may still below the possible maximum trigger point of the first control circuit due to tolerance.

Please note than the range/scale of the allowable maximum voltage of the output capacitor, the first level which is the tolerance range of the first control circuit and the second level which is the tolerance range of the second control circuit are just for illustration and does not limit the real values and/or scale as such.

The embodiment in FIG. 3 is an improvement over the circuit in FIG. 2 which has a sensing winding. The present application is not limited as such, and can also be applied to the non-winding solution in FIG. 1. Even further, the idea of the invention can also be applied to either fully discrete components/non-IC solution, or a combined solution of discrete components and IC.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

The mere fact that certain measures are recited in mutually different dependent claims does not indicate that a combination of these measures cannot be used to advantage.

If the term "adapted to" is used in the claims or description, it is noted the term "adapted to" is intended to be equivalent to the term "configured to".

Any reference signs in the claims should not be construed as limiting the scope.

The invention claimed is:

1. A driving circuit for a light emitting source, comprising an input adapted to receive a power supply;

a conversion circuit, adapted to convert the power supply and provide a converted power, comprising a power switch;

an output, adapted to output the converted power;

an output capacitor (62) connected at the output;

a first control circuit coupled to the output and connected to the power switch, adapted to sense a voltage corresponding to the voltage on the output capacitor and control the power switch operate in a power-reducing mode to reduce the converted power when the voltage corresponding to the voltage on the output capacitor sensed by the first control circuit exceeds a first level; and a second control circuit connected to the output capacitor and connected to a control terminal of the power switch, adapted to:

sense a voltage at the output capacitor and electrically connect the output capacitor and the control terminal, and apply, between the control terminal and a current-out terminal of the power switch, a first portion of the voltage on the output capacitor which first portion being higher than a maximum rating voltage for the control terminal and the current-out terminal, so as to damage and make the power switch unoperational permanently, when the voltage at the output capacitor sensed by the second control circuit exceeds a second level.

2. The driving circuit according to claim 1, wherein the highest value of the second control unit's second level is smaller than the lowest value of the allowable maximum voltage of the output capacitor wherein a voltage on the output capacitor above the allowable maximum voltage may blow up the output capacitor, the nominal value of the first level is less than the allowable maximum voltage may blow up the output capacitor, and the nominal value of the second level is higher than the nominal value of the first level.

3. The driving circuit according to claim 1, wherein the second control circuit comprises a voltage triggering component connected between an anode of the output capacitor and the control terminal of the power switch, the current-out terminal of the power switch and the cathode of the output capacitor are on the substantially same voltage potential, and the voltage triggering component is adapted to breakdown and apply the first portion of the voltage on the output capacitor across the control terminal and the current-out terminal of the power switch.

4. The driving circuit according to claim 3, wherein the voltage trigger component is adapted to clamp at most a second portion of the output voltage after breaking down such that the first portion of the output voltage is higher than the maximum rating voltage for the control terminal and the current-out terminal of the power switch, optionally the maximum rating voltage is around 20V.

5. The driving circuit according to claim 3, wherein the voltage trigger component comprises at least one of:

a TSS;

a DIAC;

a gas discharge tube; and a VDR.

6. The driving circuit according to claim 1, wherein the first control circuit is implemented at least partially by an IC.

7. The driving circuit according to claim 1, wherein the first control circuit comprises a voltage divider to sense the output voltage, the voltage divider being with a first tolerance, and the first control circuit comprises a circuit to generate a reference voltage, and a comparator for comparing the sensed voltage by the voltage divider with the reference voltage, wherein the circuit to generate the reference voltage being with a second tolerance.

8. The driving circuit according to claim 7, wherein the first control circuit is either:

connected to the output capacitor; or coupled to a power commutation component of the conversion circuit whose voltage is reflecting a voltage on the output capacitor, so as to sense a voltage at the output capacitor.

9. The driving circuit according to claim 8, wherein the power commutation component comprises a power inductor, the first control circuit is coupled to the power inductor of the conversion circuit via a sensing winding magnetically coupled to the power inductor, wherein said sensing winding has a third tolerance in reflecting the voltage on the output capacitor.

10. A lighting circuit comprising the driving circuit according to claim 1, further comprising the light emitting source connected at the output of the driving circuit.

* * * * *